(12) United States Patent
Oleniczak et al.

(10) Patent No.: US 7,174,152 B1
(45) Date of Patent: Feb. 6, 2007

(54) SYSTEM FOR EVENT CORRELATION IN CELLULAR NETWORKS

(75) Inventors: Kevin James Oleniczak, Wheaton, IL (US); Brian Kemp Knight, Chicago, IL (US); Donald George Drake, Arlington Heights, IL (US)

(73) Assignee: Sprint Spectrum L.P., Overland Park, KS (US)

( * ) Notice: Subject to any disclaimer, the term of this patent is extended or adjusted under 35 U.S.C. 154(b) by 800 days.

(21) Appl. No.: 10/382,243

(22) Filed: Mar. 5, 2003

(51) Int. Cl.
*H04M 11/04* (2006.01)
*G08G 1/09* (2006.01)
(52) U.S. Cl. .................... 455/404.1; 340/905
(58) Field of Classification Search ............. 455/404.1, 455/414.1–414.3, 423, 67.11, 186.1; 342/357.6, 342/357.13, 357.06; 340/905, 995.1, 539.28
See application file for complete search history.

(56) References Cited

U.S. PATENT DOCUMENTS

| | | | |
|---|---|---|---|
| 6,590,529 B2 * | 7/2003 | Schwoegler | 342/357.13 |
| 6,745,021 B1 * | 6/2004 | Stevens | 455/404.1 |
| 6,816,878 B1 * | 11/2004 | Zimmers et al. | 709/200 |
| 6,989,765 B2 * | 1/2006 | Gueziec | 340/905 |
| 2002/0152266 A1 * | 10/2002 | Burfeind et al. | 709/203 |
| 2003/0004780 A1 * | 1/2003 | Smith et al. | 705/10 |

\* cited by examiner

*Primary Examiner*—Benny Quoc Tieu

(57) ABSTRACT

A method and system for correlating the performance of at least one cellular coverage area with external impact events. The method can include receiving and storing performance data for the cellular coverage area. The method can also include receiving and storing a national weather service (NWS) weather alert for a geographic area near the cellular coverage area. The weather alert indicates a severe weather condition. The method further includes extracting and storing geographic coordinates, alert type, and alert time data from the NWS weather alert, and generating an output indicative of relationships between the performance of the cellular coverage area and the severe weather condition.

26 Claims, 5 Drawing Sheets

Weather Alert

Watch #815 - Severe Thunderstorm
Begin: 1/1/2003
End: 1/1/2003 5:00:00 AM
Status: Expired
NEXRAD Station: KLIX
Station Location: New Orleans THE STORM PREDICTION CENTER HAS ISSUED A SEVERE THUNDERSTORM WATCH FOR PORTIONS OF SOUTH CENTRAL AND SOUTHEAST LOUISIANA SOUTHWEST MISSISSIPPI ADJACENT COASTAL WATERS EFFECTIVE THIS TUESDAY MORNING FROM MIDNIGHT CST UNTIL 500 AM CST. HAIL TO 1 INCH IN DIAMETER...THUNDERSTORM WIND GUSTS TO 70 MPH...AND DANGEROUS LIGHTNING ARE POSSIBLE IN THESE AREAS. THE SEVERE THUNDERSTORM WATCH AREA IS ALONG AND 70 STATUTE MILES EAST AND WEST OF A LINE FROM 60 MILES SOUTHEAST OF INTRACOASTAL CITY LOUISIANA TO 30 MILES NORTH NORTHEAST OF MC COMB MISSISSIPPI.

Affected Markets: New Orleans

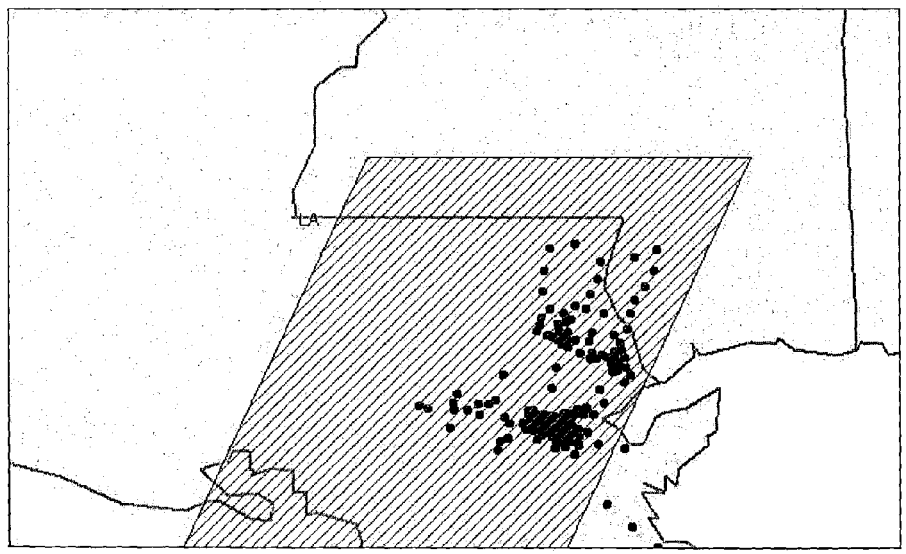

*Fig. 4*

SYSTEM FOR EVENT CORRELATION IN CELLULAR NETWORKS

BACKGROUND

1. Field of the Invention

The present invention relates to wireless communications and, more particularly, to correlating cell site performance with external events.

2. General Background

To ensure reliable operation of modern cellular and PCS (personal communications service) systems, redundancy and monitoring of system-critical elements is key. For example, if a remotely located component (such as a power supply, for example) in a base transceiver station fails, the component's failure can be automatically reported via an electronic alarm. Typically, if the component is critical and the nature of the component allows, a redundant component can keep the base transceiver station (or part of it) online while a technician responds to the alarm by replacing the failed component. Unfortunately, not every critical or important component or system can be electronically monitored, especially if a failure is "soft"—that is, degrades performance without forcing a system or subsystem to go offline. A system that can correlate such performance degradation with possible causes is desired.

SUMMARY

In one aspect, a method for correlating cell site performance (e.g., blocked or dropped calls) with external impact events is provided. The method includes receiving and storing performance history data for the cell site. The performance history data includes performance history time data. The method also includes receiving and storing a weather alert, such as a national weather service (NWS) weather alert that defines a geographic area near or enclosing the cell site, and that indicates a severe weather condition.

Geographic coordinates, alert type, and alert time data from the weather alert are extracted and stored, and an output indicative of a temporal and a geographic relationship between the cell site and the severe weather condition is generated.

In another aspect, a method for correlating cellular coverage area performance (e.g., blocked or dropped calls) with external impact events is provided. The method includes receiving and storing performance history data for the cellular coverage area. The performance history data includes performance history time data. The method also includes receiving and storing a weather alert that defines a geographic area near the cellular coverage area, and that indicates a severe weather condition. Geographic areas covered by weather alerts are known as "watch boxes", and are typically defined by the latitude and longitude of four corner points. Geographic coordinates, alert type, and alert time data from the weather alert are extracted and stored.

The method also includes acquiring radar image data from a radar station near the watch box, the radar image data having a temporal relationship to the weather alert. The image can be scanned for severe weather points, and the latitude and longitude of the severe weather points can be calculated. The severe weather points are points that exceed a threshold level of radar return energy. The latitude and longitude of the severe weather points are stored, and a spatial proximity search is performed to compare the location of the severe weather points with the location of the plurality of cellular coverage areas.

An output indicative of a temporal and a geographic relationship between the cellular coverage area and the severe weather condition is generated. The output also indicates temporal and spatial relationships between the cellular coverage areas and the severe weather points.

In yet another aspect, a system for correlating the performance of a cell site with external impact events, is provided. The system can include a processor, data storage, and instructions stored in the data storage and executable by the processor to receive performance history data for the cell site. The performance history data includes time data. The instructions are further executable to receive a weather alert that includes a geographic area near the cell site and that indicates a severe weather condition. The instructions cause the processor to extract and store geographic coordinates, alert type, and alert time data from the weather alert, and then generate an output indicative of a temporal and a geographic relationship between the cell site and the severe weather condition.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Presently preferred embodiments of the invention are described below in conjunction with the appended figures, wherein like reference numerals refer to like elements in the various figures, and wherein:

FIG. 4 illustrates an exemplary display that can be generated by the present system.

DETAILED DESCRIPTION

In an exemplary embodiment of the invention, a system for correlating external impact events with cellular coverage areas is presented. The system may be used in conjunction with individual cell sites or, alternatively, with cellular coverage areas that include critical components that can not be adequately monitored electronically for failures or performance problems. For example, antenna elements and cabling can suffer degradations in performance without necessarily producing immediately detectable fault conditions. Furthermore, such degradations can be caused or worsened by external impact events, such as the lightning, precipitation, and high winds that can accompany severe weather. Correlating, in space and time, coverage area performance degradation with external impact events can provide valuable insight into performance-degrading equipment problems and allow them to be corrected before they become critical.

Figure 1:
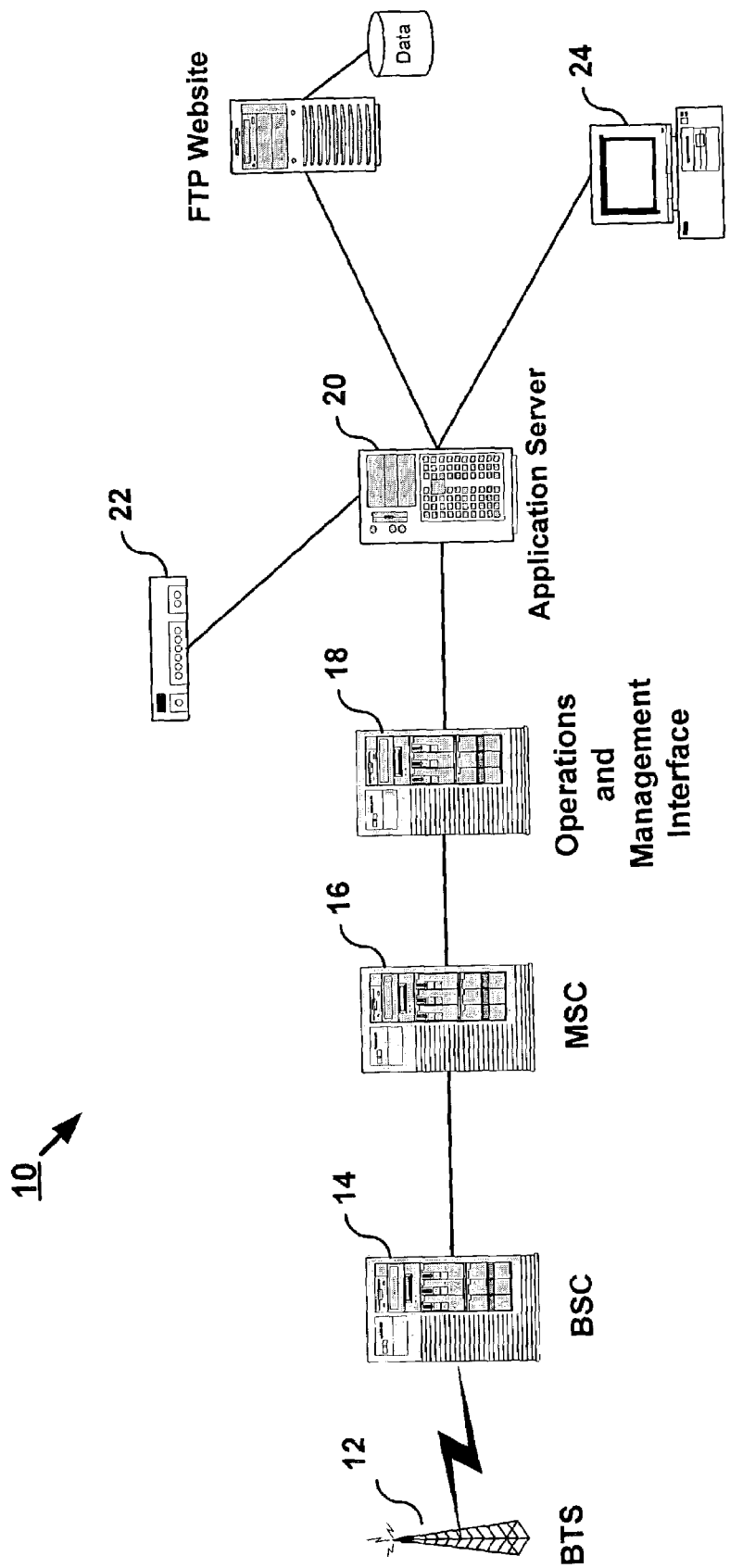
FIG. 1 illustrates a portion of a telecommunications network in which the present system may be used.

Referring now to the drawings, FIG. 1 is a generalized block diagram of a portion of a communication network 10 suitable for carrying communications between mobile stations and various network entities. As shown in FIG. 1, the network 10 may include a radio network that comprises various network entities, such as: a base transceiver station (BTS) such as BTS 12; a base station controller (BSC) such as BSC 14; and a mobile switching center (MSC) such as MSC 16, as in conventional cellular networks. For purposes of illustration, only one BSC and MSC are shown, but it will be understood that the present system is capable of operation with multiple base stations and switching centers. Because BTS 12, BSC 14, and MSC 16 can be conventional components of a radio network, they are not described in detail here.

MSC 16 can be communicatively coupled to an MSC operation and management interface 18, which provides the operations, administration, maintenance, and provisioning interface to the MSC 16. In addition, operation and management interface 18 establishes, maintains, and collects network data that can be used by a service provider to monitor and control system performance. The operation and management interface is communicatively coupled to one or more servers dedicated to carrying out the functions of the system, such as application server 20. The present system works with MSCs and operation and management interfaces from four vendors: Motorola, Lucent, Samsung and Nortel. Compatibility with interfaces from other vendors can readily be accomplished by software and/or hardware modification. Performance data from operation and management interface 18 are normalized to a single, consistent format regardless of the switch manufacturer. Accordingly, the system can be intuitive for nationwide users who utilize switching equipment from multiple manufacturers.

Examples of operation and management interfaces from Motorola, Lucent, and Nortel include the Lucent Flexent OMP-FX (Operations & Management Platform), the Motorola OMC-R (Operations and Maintenance Center-Radio), and the Nortel BSS (Base Station Subsystem) Manager. The Nortel BSS manager is the interface to Nortel's base station controller and base station transceiver subsystem, rather than an MSC, but this has no impact on the system operation described herein. The operation and management interface 18 provides raw system performance data to the dedicated application server 20 via ftp or other suitable protocol.

Although only one application server, application server 20, is illustrated, it will be understood that the functions described herein can also be performed by multiple, interconnected servers, and that performance and maintenance advantages may be realized from such distributed processing. For example, switch performance data and severe weather messages could be received by a staging server (not shown), and data collected by the system could be stored, organized, and maintained by a database server (not shown) communicatively coupled to the staging server and the application server. As an alternative to the architecture shown in FIG. 1, it is also possible for the application server 20 to receive raw performance data directly from the MSC 16 or from BSC 14.

In addition to network performance data, the application server 20 receives periodic national weather service severe weather alerts via email from email client 22. Such emails can be received automatically from various "listserv" services, such as "WX-Storm" operated by the University of Illinois, to which users can subscribe by sending an email to
LISTSERV@LISTSERV.UIUC.EDU
with the command, "SUBSCRIBE WX-STORM".

Application server 20 receives raw NEXRAD (next-generation radar) radar image data, corresponding to areas of defined by severe weather alerts, from a government ftp website such as ftp://tgftp.nws.noaa.gov. Application server 20 generates performance maps and charts for users' viewing and analysis at display station 24. Display station 24 may be a personal computer or a workstation running a web browser or special software dedicated to displaying the results generated by the present system.

Figure 2:
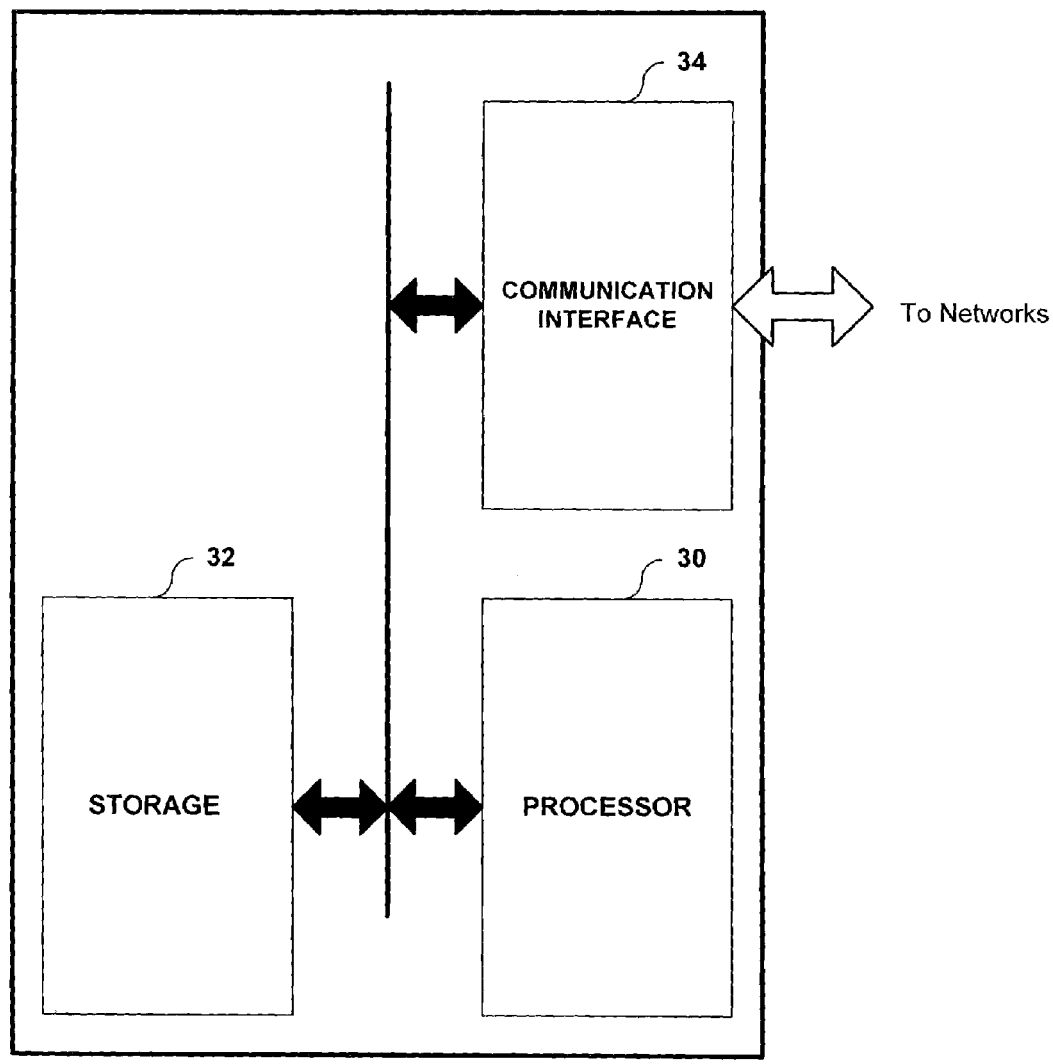
FIG. 2 is a block diagram of an application server in which an exemplary embodiment of the present system can be implemented.

FIG. 2 is a simplified diagram illustrating functional blocks of application server 20 or any other telecommunication apparatus in communication with application server 20, operation and management interface 18, or other components from which performance data and impact event data may be collected. Generally, application server 20 may include a processor 30, storage 32, and a communications interface 34, all communicatively interconnected. Processor 30 may include, for example, one or more integrated circuit microprocessors, and storage 32 may be a ROM, flash memory, non-volatile memory, optical memory, magnetic medium, combinations of the above, or any other suitable memory.

Storage 32 may include more than one physical element, and may also include a number of software routines, program steps, or modules that are executable by processor 30 to carry out the various functions described herein. These functions may include, but are not necessarily limited to, a weather alert function, a performance data function, a radar image function, and an output function.

The weather alert function receives and stores national weather service alerts, and also extracts and stores geographic coordinates, alert type, and alert time data from the received weather alerts. The performance data function receives and stores performance history data for multiple cell sites or coverage areas. The system is scalable, so that impact events can be correlated with network performance over relatively small areas, as well as nationwide.

The radar image function is capable of acquiring radar image data from official NEXRAD sites. The image files can be retrieved according to times the images were generated. NEXRAD images are generated as frequently as every few minutes, so the present correlation system can readily acquire images that correspond to received severe weather alerts, although it will not always be necessary or practical to download and store all images that are available for the duration of a particular weather alert.

The output function may include or interface with commercially available mapping software to generate graphic event correlation displays, and can generate both graphic and text-based outputs for user analysis of network performance. To accomplish this, the output function uses the weather alert data, the coverage area performance data, and the image data acquired by the system.

Figure 3:
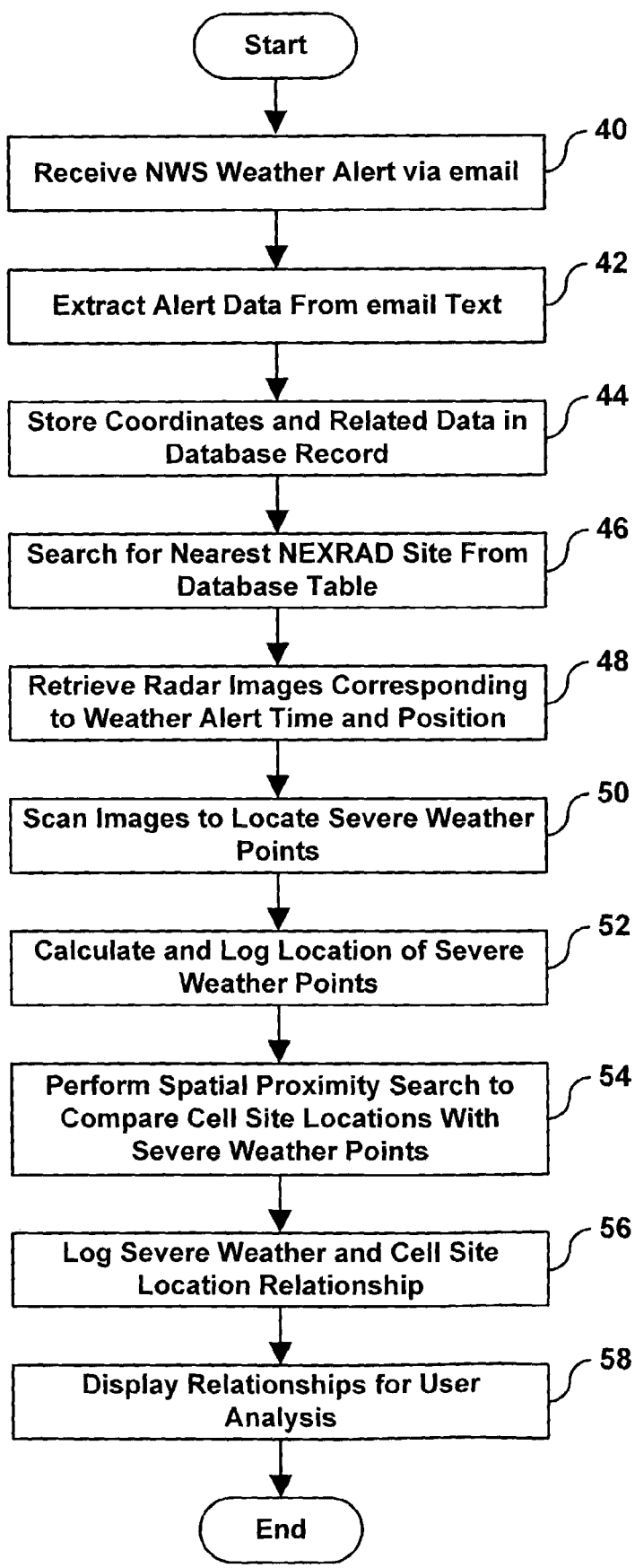
FIG. 3 is a flow chart illustrating the operation of the present system.

The functionality of the various elements of application server 20 or another entity designed to carry out the functions of the present system can be best understood with reference to the network diagram of FIG. 1 and the flow chart of FIG. 3.

FIG. 3 illustrates a set of steps that may be carried out in accordance with the present system. At step 40, application server 20 receives a national weather service alert via email from email client 22. At step 42, application server 20 can execute a script to parse the text of the alert to extract four sets of coordinates that define a severe weather watch box, the beginning and end date and time of the weather watch, and other data. The English-language text of severe weather watches and warnings can thus be converted to a consistent file format for producing performance maps, charts, and displays that correlate weather conditions with network system performance. The following is an example of a text-format severe thunderstorm watch from which data can be extracted:

WWUS20 KWNS 241824

SEL6

SPC WW 241821

ILZ000-WIZ000-LMZ000-250000-

URGENT—IMMEDIATE BROADCAST REQUESTED SEVERE THUNDERSTORM WATCH NUMBER 146 STORM PREDICTION CENTER NORMAN OK 121 PM CDT WED APR 24 2002

THE STORM PREDICTION CENTER HAS ISSUED A SEVERE THUNDERSTORM WATCH FOR PORTIONS OF

NORTHEAST ILLINOIS

SOUTHEAST AND PART OF EAST-CENTRAL WISCONSIN

WESTERN LAKE MICHIGAN

EFFECTIVE THIS WEDNESDAY AFTERNOON AND EVENING FROM 130 PM UNTIL 700 PM CDT.

HAIL TO 1 INCH IN DIAMETER . . . THUNDERSTORM WIND GUSTS TO 70 MPH . . . AND DANGEROUS LIGHTNING ARE POSSIBLE IN THESE AREAS.

THE SEVERE THUNDERSTORM WATCH AREA IS ALONG AND 50 STATUTE MILES EITHER SIDE OF A LINE FROM 15 MILES EAST SOUTHEAST OF BLOOMINGTON ILLINOIS TO 30 MILES NORTHWEST OF MANITOWOC WISCONSIN.

REMEMBER . . . A SEVERE THUNDERSTORM WATCH MEANS CONDITIONS ARE FAVORABLE FOR SEVERE THUNDERSTORMS IN AND CLOSE TO THE WATCH AREA.

PERSONS IN THESE AREAS SHOULD BE ON THE LOOKOUT FOR THREATENING WEATHER CONDITIONS AND LISTEN FOR LATER STATEMENTS AND POSSIBLE WARNINGS. SEVERE THUNDERSTORMS CAN AND OCCASIONALLY DO PRODUCE TORNADOES.

OTHER WATCH INFORMATION . . . CONTINUE . . . WW 145 . . .

DISCUSSION . . . UNSEASONABLY STRONG UPPER SYSTEM AND ASSOCIATED SURFACE COLD FRONT WILL SHIFT QUICKLY EWD ACROSS WW THIS AFTERNOON.

LARGE HAIL MAY ACCOMPANY STORMS AHEAD OF THIS SYSTEM . . . WITH AN INCREASED THREAT OF DAMAGING WINDS IF ACTIVITY BECOMES ROOTED ALONG THE COLD FRONT.

AVIATION . . . A FEW SEVERE THUNDERSTORMS WITH HAIL SURFACE AND ALOFT TO 1 INCH EXTREME TURBULENCE AND SURFACE WIND GUSTS TO 60 KNOTS.

A FEW CUMULONIMBI WITH MAXIMUM TOPS TO 400. MEAN STORM MOTION VECTOR 26040.

. . . EVANS

; 442,0870 401,0874 402,0893 443,0890;

From this text, the application server 20 can extract:
message issue date and time;
watch number;
watch type;
message type (new, update, or cancelled);
effective date/time start;
effective date/time end;
time zone of the effective date/time start;
latitude of point 1;
longitude of point 1;
latitude of point 2;
longitude of point 2;
latitude of point 3;
longitude of point 3;
latitude of point 4;
longitude of point 4;
message body;
storm heading;
storm speed; and
replaces watch number,
and format the data in delimited fields. At step 44, application server 20 can store the watch area's coordinates and related information in a database record. At step 46, application server 20 can search a database table (either local or remote) for the NEXRAD station closest to the watch area. Next, at step 48, application server 20 can access an official ftp website to retrieve radar images of the watch area. Desired images can be retrieved by specifying the date, time, and unique radar station code (such as station KLIX in New Orleans, for example).

Image data retrieved can include base reflectivity, mean radial velocity, spectrum width, calibration, date, time, antenna position, and operational mode (e.g., clear air mode VCP 31 and 32, and precipitation mode VCP 11 and 21). The image can be registered so that the four corners of the watch area register correctly with the radar image according to NAD83 (North American Datum of 1983). Registering the image allows a more accurate representation of a portion of the earth's curved terrain to be displayed on a flat medium (such as a computer screen or a printout).

The registered image can be stored in a database for later retrieval and display. The image may be stored as a raster image file for use with various mapping tools, such as MapXtreme NT from MapInfo. Mapping software such as MapXtreme allows composite images that show weather conditions, cell-site performance, geographic features, and other information, to be displayed. As shown at step 50, the stored image can be scanned to detect pixels that meet or exceed a threshold value of base reflectivity, representing the more severe weather in the image. Typically, pixels that represent a base reflectivity return of a given strength will be mapped to a particular color for display. At step 52, the latitude and longitude of the severe weather pixels are calculated and logged so that a list of the most severe weather points in the area in any given image can be maintained.

Cell site location data can be maintained in a database accessible to application server 20 so that application server 20 can perform a spatial proximity search to compare cell site locations with the locations of the most severe weather points, as shown at step 54. This allows the relationship between cell sites and severe weather points to be maintained and stored in a database, as shown at step 56. At step 58, various displays that indicate various relationships between the coverage area's performance and the severe weather are presented to users for analysis. The steps illustrated in FIG. 3 can be repeated indefinitely to acquire as many radar images as necessary to provide data corresponding to one or more severe weather alerts. The application server 20 and the other components described herein can process and transmit data at sufficient speed to present displays in substantially real time, but the pertinent data are also stored or accessible such that a user can view historic data going back hours, days, or even months.

Application server 20 uses vendor-specific scripts to create performance data files in text-based format. Thus, regardless of which vendor's switch supplies the performance data, the performance data files created are in one consistent format. Once application server 20 has access to severe weather data, corresponding cell site locations, and cell site or regional performance data, charts, maps, and other displays can be presented to users to illustrate interrelationships between performance and external impact events, such as thunderstorms, high winds, tornadoes, and the like. The interrelationships can be readily seen at a computer such as display station 24 in FIG. 1. Performance data can be averaged, if desired, so that performance degradations of very short duration are not given undue weight, although such degradations could be used to indicate that a cell site would benefit from preventative maintenance.

FIG. 4 is a screen printout of one exemplary display that the system can generate. FIG. 4 illustrates the correlation between a cellular coverage area and severe weather conditions. As shown, a severe Thunderstorm watch area, as defined by a severe weather alert from the storm prediction center in Norman, Okla., is shaded on a map of the New Orleans cellular market area. The map concurrently shows individual cell sites within the storm warning area, and the display provides time data as well as the actual text of the corresponding weather alert. The display also indicates that radar images for the alert area would come from NEXRAD station KLIX in New Orleans.

The system can also provide a detail view (not shown) of a storm area corresponding to the most severe weather pixels detected in a radar image. Such a detail view can include graphic icons that represent individual cell sites in a coverage area. The icons would typically be accompanied by individual cell site designations, and the icons can be shaded according to their performance at the time represented by the display. For example, different shading could be used to represent 0%–2% blocked calls, 2%–5% blocked calls, 5%–15% blocked calls, and >15% blocked calls. Other performance parameters could also be displayed in the detail view. For example, a user could select another performance parameter, such as failed call attempts, from a drop-down menu, resulting in a corresponding change to the cell site icon shading.

On the same detail view, severe weather can be displayed as different colored pixels, the color of a pixel corresponding to the base reflectivity of the NEXRAD image that is examined. Base reflectivity data from NEXRAD sites is digitized in decibel scale (dbZ). For example, base reflectivity (which indicates storm severity) can be displayed in 5 dbZ increments that range from non-detectable to >75 dbZ. The simultaneous display of severe weather conditions with cell site performance allows users to quickly and intuitively recognize any performance problems caused by severe weather. The detail view described can be zoomed in or out to show more or less detail of the weather conditions, cell sites, and geographic features of the area being studied. The user can also select, via radio button on the display (for example), the type of performance statistics displayed, such as daily average, busy hour, or other statistics. The user can similarly select the desired date and time to display, and the body of the weather alert text message can also be displayed as either a floating window over the rest of the display or as a drop-down item.

Figure 5:
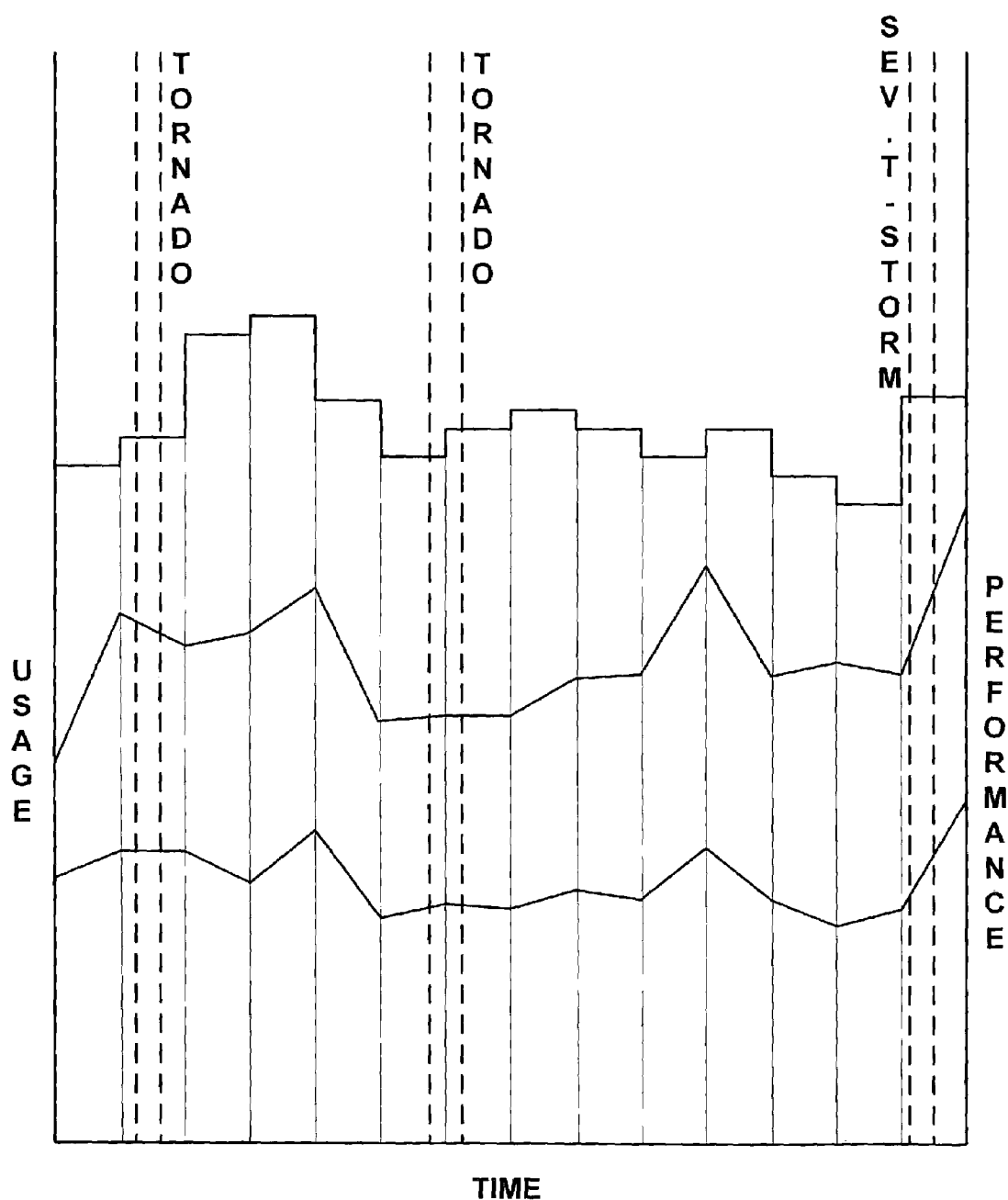
FIG. 5 illustrates another exemplary display that can be generated by the present system.

FIG. 5 is a simplified representation of a display that correlates the performance of an individual cell site with various severe weather conditions. Although FIG. 5 is illustrative of a single cell site, a coverage area comprising multiple sites could also be displayed. The horizontal axis represents time; at the resolution shown, 15 days' performance history may be viewed at once. The user can select different start and end dates from drop-down calendars (not shown), which will change the scale of the display accordingly. As shown, the cell site for which data are displayed experienced two tornado watches, and also a severe thunderstorm watch. The width of the bars that indicate the weather conditions correspond to the duration of the weather alerts. The bar chart display, whose scale is indicated along the left vertical axis, can indicate the total minutes of use or the number of calls of the cell site for each day.

The system is also capable of displaying different increments of time. For example, the display could range from hours to months or other time periods. If a user requests a display covering a time whose corresponding image is not already stored, the image can be readily downloaded from an ftp site as described.

The trendlines of the display represent the percentage of dropped calls and access failures, according to a scale that can be displayed on the right vertical axis. The trendlines can be displayed as rolling averages, percentages over time without filtering or averaging, or any other suitable format. Using conventional graphical user interface techniques, users can switch the performance statistics that are displayed and the averaging, if any, used to display the trendlines. In the figure, the upper trendline could indicate the percentage of dropped calls, while the lower trendline could indicate the percentage of access failures, both as measured against the total usage for the indicated time period. Of course, the system could easily display trendlines that represent other performance statistics as well.

As shown in FIG. 5, an increase in the vertical distance of a trend line indicates a degradation of cell site performance. For example, in the figure, the two tornado watches had no readily discernable effect on performance, but the severe thunderstorm had an adverse effect on performance that could indicate a problem that the user may want to report or log so that preventative maintenance can be performed.

Exemplary embodiments of the present system have been described above. Those skilled in the art will understand, however, that changes and modifications may be made to these embodiments without departing from the true scope and spirit of the invention, which is defined by the claims.

We claim:

1. A method of correlating the performance of at least one cellular coverage area with external impact events, the method comprising:

receiving and storing performance history data for the at least one cellular coverage area, the performance history data including performance history time data and thus indicating performance history of the at least one cellular coverage area over time;

receiving and storing weather information for a geographic area near the at least one cellular coverage area and that indicates a severe weather condition;

extracting and storing geographic coordinates, alert type, and alert time data from the weather information; and generating an output indicative of a relationship between (i) the performance history of the at least one cellular coverage area and (ii) the severe weather condition.

2. The method of claim 1, wherein the relationship is geographic.

3. The method of claim 1, wherein the relationship is temporal.

4. The method of claim 1, wherein the relationship is geographic and temporal.

5. The method of claim 1, wherein the output comprises information in text form.

6. The method of claim 1, wherein the output comprises information in graphical form.

7. The method of claim 1, wherein receiving the weather information comprises receiving via email.

8. The method of claim 7, wherein the weather information comprises information in text format.

9. The method of claim 8, wherein the weather information further specifies four sets of coordinates that define a watch box.

10. The method of claim 8, wherein the alert time data includes watch beginning and end date and watch beginning and end time.

11. The method of claim 9, further comprising:
acquiring radar image data from a radar station near the watch box, the radar image data having a temporal relationship to the weather information;
calculating the latitude and longitude of severe weather points in the radar image data, the severe weather points being points that exceed a threshold level of radar return energy;
storing the latitude and longitude of the severe weather points; and
performing a spatial proximity search to compare the location of the severe weather points with the at least one cellular coverage area location;
wherein the output is further indicative of at least a spatial relationship between the at least one cellular coverage area and the severe weather points.

12. The method of claim 11, wherein the output is further indicative of a geographic relationship between the at least one cellular coverage area and the severe weather points.

13. The method of claim 11, wherein the at least one cellular coverage area is a plurality of cellular coverage areas.

14. The method of claim 11, wherein the steps are carried out in substantially real time.

15. The method of claim 1, wherein the output is generated using stored information that is at least about an hour old.

16. The method of claim 11, wherein the weather information comprises a national weather service (NWS) weather alert.

17. The method of claim 2, wherein the at least one cellular coverage area is within the geographic area.

18. A method of correlating the performance of a plurality of cellular coverage areas with external impact events, the method comprising:
receiving performance history data for the plurality of cellular coverage areas, the performance history data including performance history time data and thus indicating performance history of the plurality of cellular coverage areas over time;
receiving, via email, at least one NWS weather alert including a geographic area near the plurality of cellular coverage areas and comprising a severe weather condition, wherein the at least one NWS weather alert comprises four sets of coordinates that define a watch box;
extracting and storing geographic coordinates, alert type, and alert time data from the at least one NWS weather alert, wherein the alert time data includes watch beginning and end date and watch beginning and end time;
acquiring radar image data from a radar station near the watch box, the radar image data having a temporal relationship to the NWS weather alert;
calculating the latitude and longitude of severe weather points in the radar image data, the severe weather points being points that exceed a threshold level of radar return energy;
storing the latitude and longitude of the severe weather points;
performing a spatial proximity search to compare the location of the severe weather points with the location of the plurality of cellular coverage areas; and
generating an output indicating spatial relationship between the plurality of cellular coverage areas and the severe weather points, the output further indicating a correlation between (i) the performance history of the plurality of cellular coverage areas and (ii) the severe weather condition.

19. A system for correlating the performance of at least one cellular coverage area with external impact events, the system comprising:
a processor;
data storage; and
instructions stored in the data storage and executable by the processor to:
receive performance history data for the at least one cellular coverage area, the performance history data including performance history time data and thus indicating performance history of the at least one cellular coverage area over time;
receive weather information for a geographic area near the at least one cellular coverage area, the weather information indicating a severe weather condition;
extract and store geographic coordinates, alert type, and alert time data from the weather information; and
generate an output that correlates (i) the performance history of the at least one cellular coverage area with (ii) the severe weather condition.

20. The system of claim 19, wherein the weather information is received via email.

21. The system of claim 20, wherein the weather information comprises information in text format.

22. The system of claim 19, wherein the weather information further comprises four sets of coordinates that define a watch box.

23. The system of claim 19, wherein the at least one cellular coverage area is a plurality of cellular coverage areas.

24. The system of claim 19, wherein the instructions are further executable to:
acquire radar image data from a radar station near the watch box, the radar image data having a temporal relationship to the weather information;
calculate the latitude and longitude of severe weather points in the radar image data, the severe weather points being points that exceed a threshold level of radar return energy;
store the location and time data of the severe weather points; and perform a spatial proximity search to compare the location of the severe weather points with the at least one cellular coverage area location;

wherein the output is further indicative of spatial relationships between the severe weather points and the at least one cellular coverage area.

25. The system of claim 19, wherein the weather information comprises an NWS weather alert.

26. A system for correlating the performance of a plurality of cellular coverage areas with external impact events, the system comprising:

a processor;

data storage; and instructions stored in the data storage and executable by the processor to:

receive performance history data for the plurality of cellular coverage areas, the performance history data including performance history time data;

receive a national weather service (NWS) weather alert for a geographic area near the at least one cellular coverage area and that indicates a severe weather condition;

extract and store geographic coordinates, alert type, and alert time data from the NWS weather alert;

acquire radar image data from a radar station near the watch box, the radar image data having a temporal relationship to the NWS weather alert;

calculate the latitude and longitude of severe weather points in the radar image data, the severe weather points being points that exceed a threshold level of radar return energy;

store the location and time data of the severe weather points; and perform a spatial proximity search to compare the location of the severe weather points with the at least one cellular coverage area location; and generate an output indicative of temporal and geographic relationships between the plurality of cellular coverage areas and the severe weather points, the output further indicative of performance of the plurality of cellular coverage areas over time.

* * * * *